(12) United States Patent
Williams

(10) Patent No.: US 8,430,445 B1
(45) Date of Patent: Apr. 30, 2013

(54) IMPACT PROTECTOR FOR VEHICLE WINDSHIELDS

(76) Inventor: James Williams, Aliso Viejo, CA (US)

( * ) Notice: Subject to any disclaimer, the term of this patent is extended or adjusted under 35 U.S.C. 154(b) by 0 days.

(21) Appl. No.: 12/821,569

(22) Filed: Jun. 23, 2010

Related U.S. Application Data

(60) Provisional application No. 61/269,416, filed on Jun. 23, 2009.

(51) Int. Cl.
*B60J 1/20* (2006.01)

(52) U.S. Cl.
USPC .............. 296/95.1; 296/136.01; 296/136.13; 150/168; 160/370.21

(58) Field of Classification Search .............. 296/95.1, 296/136.01, 136.02, 136.1, 136.13; 150/168; 160/370.21
See application file for complete search history.

(56) References Cited

U.S. PATENT DOCUMENTS

| | | | |
|---|---|---|---|
| 4,726,406 A | | 2/1988 | Weatherspoon |
| 4,862,943 A | * | 9/1989 | Shafia ...................... 160/370.21 |
| 4,966,405 A | * | 10/1990 | Tremaine et al. ............ 296/95.1 |
| 5,037,156 A | * | 8/1991 | Lundberg ..................... 296/95.1 |
| 5,356,191 A | * | 10/1994 | Sheehan ....................... 296/95.1 |
| 5,413,396 A | * | 5/1995 | Poznansky et al. ...... 296/136.13 |
| 5,415,214 A | * | 5/1995 | Bock et al. ..................... 150/168 |
| 5,615,923 A | * | 4/1997 | Madison ..................... 296/95.1 |
| 6,015,180 A | * | 1/2000 | Beuerle ....................... 296/95.1 |
| 6,241,303 B1 | * | 6/2001 | Yee .............................. 296/95.1 |
| 6,779,827 B2 | * | 8/2004 | Clark ............................. 296/98 |
| 7,059,650 B1 | * | 6/2006 | Wood ........................... 296/95.1 |
| 7,823,953 B2 | * | 11/2010 | Haas ............................ 296/95.1 |
| 7,931,325 B2 | * | 4/2011 | Robbins ....................... 296/95.1 |
| 2003/0226627 A1 | * | 12/2003 | Clark ............................. 150/166 |
| 2004/0227373 A1 | * | 11/2004 | Robbins ....................... 296/95.1 |
| 2005/0000664 A1 | * | 1/2005 | Huang ..................... 160/370.21 |
| 2005/0179281 A1 | * | 8/2005 | Brown ......................... 296/95.1 |
| 2007/0144688 A1 | * | 6/2007 | Grat ........................ 160/370.21 |
| 2009/0261614 A1 | * | 10/2009 | Haas ............................ 296/95.1 |
| 2009/0301671 A1 | * | 12/2009 | Locklear .................. 160/370.21 |
| 2010/0200180 A1 | * | 8/2010 | Lien ........................ 160/370.21 |

* cited by examiner

*Primary Examiner* — Lori Lyjak
(74) *Attorney, Agent, or Firm* — Patent Law & Venture Group; Gene Scott

(57) ABSTRACT

An impact resistant cover for protecting a vehicle windshield is made up of a plurality of spaced apart rectangular panels, the panels having a flexible, puncture resistant, covering, the covering enclosing a resilient material having a thickness of between 0.5 and 1.5 inches. Flexible webs interconnect the panels while enabling the panels to lie in a common plane in a first selective positioning of the panels, and alternately to lie one panel atop the next panel in a vertically aligned stack of all of the panels, in a second selective positioning of the panels. Handles permit the stack to be carried easily and straps allow the cover to be secured to a vehicle's doors or windows while lying on the vehicles windshield.

12 Claims, 2 Drawing Sheets

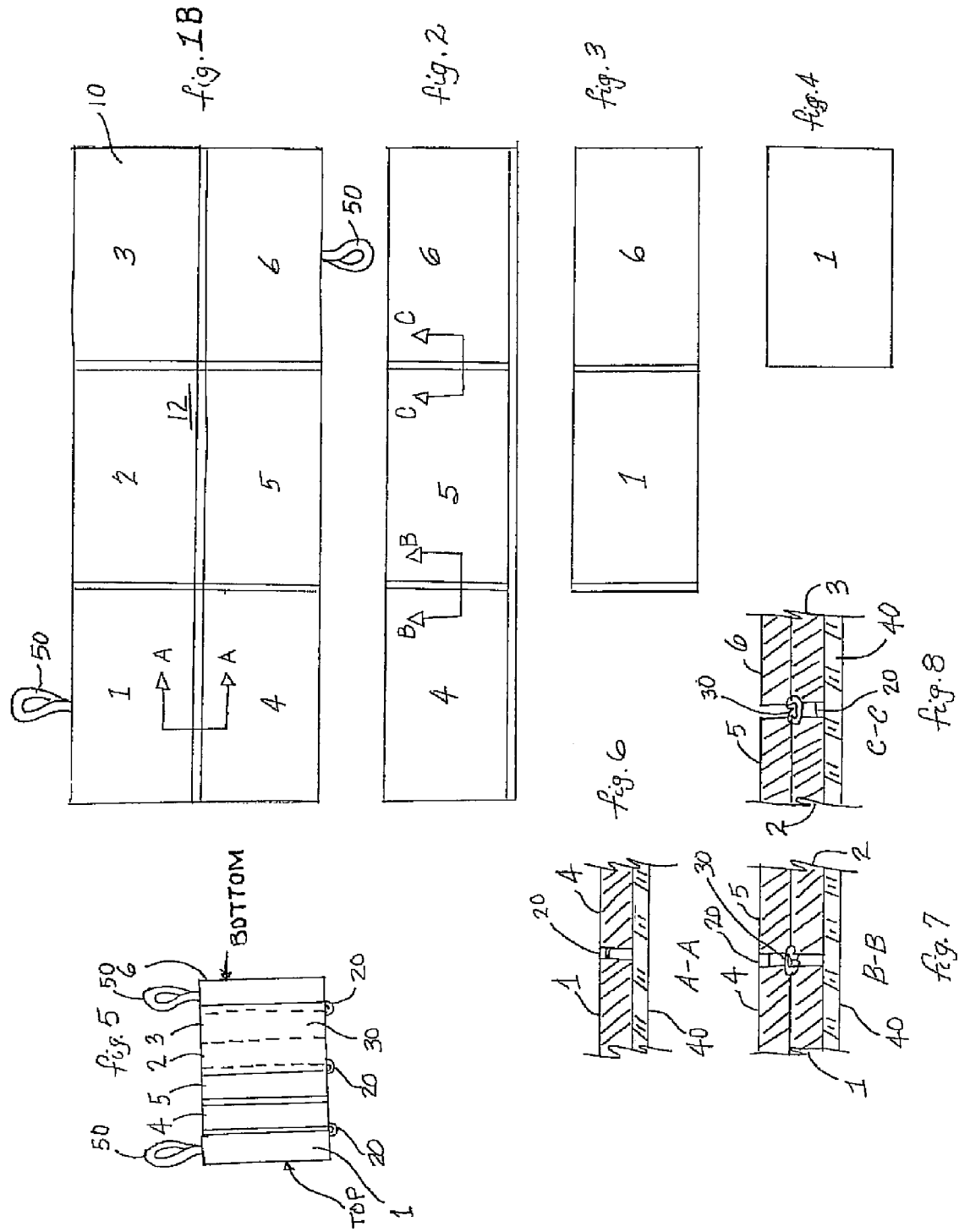

IMPACT PROTECTOR FOR VEHICLE WINDSHIELDS

CROSS-REFERENCE TO RELATED APPLICATIONS

This application is a non-provisional application describing the same invention as an active provisional application, Ser. No. 61/269,416, filed on Jun. 23, 2009, and being filed within one year, hereby claims date priority therefrom.

BACKGROUND OF THE INVENTION

1. Field of the Present Disclosure

This disclosure relates generally to protective pads and shields, and more particularly to an apparatus for protecting a windshield from damage by flying objects.

2. Description of Related Art Including Information Disclosed Under 37 CFR 1.97 and 1.98

Lundberg, U.S. Pat. No. 5,037,156 discloses a device for the protection of a vehicle's windshield from heat, frost, rain, snow, and the like. The protector is preferably a layer of polyethylene which covers the outside of the windshield. The cover is held in place by two wings which are secured between the vehicle's doors and their frames. Placement of these wings within the door is facilitated through the use of handles or cords which attach to the wing and are long enough to permit the operator to keep their hand from the doorway during closure of the vehicle's door.

Weatherspoon, U.S. Pat. No. 4,726,406 discloses a protective cover for a vehicle window includes a vinyl sheet having a cloth backing for application to the window. The sheet is held in place by straps which are looped around stiffener bars on the side edges of the sheet. The straps extend into the interior of the vehicle where they are attached to mating fasteners in order to secure the sheet on the window. The attachment system permits detachment of the protective sheet only from the interior of the vehicle and thereby provides security against theft.

The related art described above discloses windshield protectors made with thin layers of sheet materials which protects the windshield from the natural elements and helps to prevent theft by limiting visual disclosure of the vehicle's interior spaces. However, the prior art fails to teach a windshield protector that is able to prevent windshield damage from physical impact. The related art also fails to disclose the presently disclosed means with improved folding and carrying features. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The invention is an impact resistant cover for protecting a vehicle's windshield from damage, due to impacts. Flying objects, such as: baseballs, soccer balls, falling debris at construction sites, and other items, have been known to damage windshields. The cover is placed on the windshield and is secured in place by straps. The cover is preferably made of a plastic or rubber foam material covered with vinyl sheeting or similar material to achieve a water impermeable product.

The invention is large enough to cover a typical windshield when laid flat. It is made up of separate rectangular panels separated by flexible webs that allow for folding of one panel over another to achieve a stacked assembly. A pair of handles, may be used and preferably are located at the top and bottom of the cover when stacked. This positions the handles adjacent to one another and therefore allows for conveniently carrying the cover. When laid on a windshield, the cover is secured by straps extending from both sides of the cover and clamped between the vehicle's windows or doors. In this way, the cover is unable to be stolen A primary objective inherent in the above described apparatus and method of use is to provide advantages not taught by the prior art.

Another objective is to provide impact protection cover for a vehicle windshield.

A further objective is to provide such a cover that is able to be folded into a convenient stack for easy portage and compact storage.

A still further objective is to provide such a cover that is able to be secured to a vehicle without locks or other extraneous hardware.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 1B is a plan view thereof;

Figure 1A:
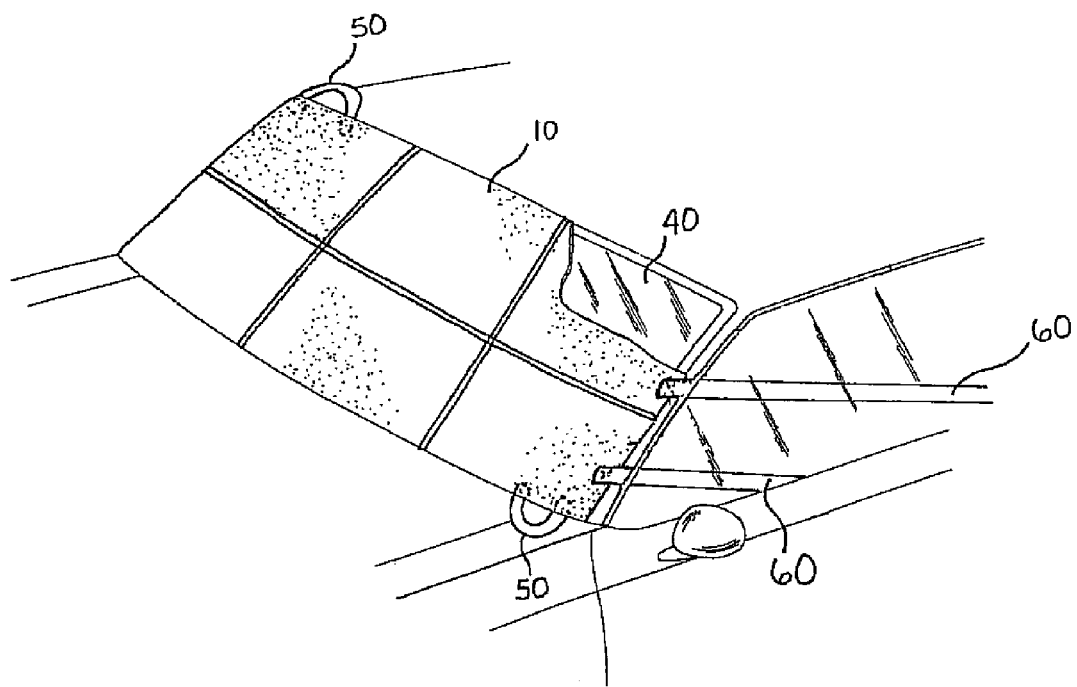
FIG. 1A is a perspective view of the invention as used for protecting a windshield of an automobile.

FIG. 2 is a plan view with panels 4, 5 and 6 folded over on top of panels 1, 2 and 3;

FIG. 3 is a plan view with panels 1 and 4 folded over on top of panels 2 and 5;

FIG. 4 is a plan view with panels 1-6 folded into a stack with each panel on top of the next;

FIG. 5 is a side elevational view of the stack of FIG. 4;

FIG. 6 is a partial cross-sectional view taken alone line A-A in FIG. 1B;

FIG. 7 is a partial cross-sectional view taken along line B-B in FIG. 2; and

FIG. 8 is a partial cross-sectional view taken along line C-C in FIG. 2.

DETAILED DESCRIPTION OF THE INVENTION

The above described drawing figures illustrate the described apparatus and its method of use in at least one of its preferred embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the presently defined and claimed invention.

Described now in detail is an impact resistant cover 10 for protecting a vehicle's windshield 40 from damage, including the development of cracks, due to impacts. Flying objects, such as: baseballs, soccer balls, falling debris at construction sites, and other items, are known to often strike an automobile's windshield. Cover 10 is an impact resistant barrier that is placed on the windshield 40 and is secured in place using straps 60. The cover 10 is preferably made of a plastic or rubber foam material which is covered with a vinyl or other flexible water impermeable envelope.

The cover 10 is large enough to cover a typical vehicle windshield and may be about 60" from side to side and about 40" from top to bottom, and preferably has a plurality of separate panels, six such panels being shown in FIGS. 1A and 1B, which displays a top surface 12 of cover 10 which is fully unfolded and deployed for use on a windshield 40. A longitudinal fold, as shown in FIG. 6, provides a web 20 that is flush with the top surface 12 of the cover 10, and which extends from left to right in FIG. 1B across the cover 10 separating three panels, 1, 2, and 3 above the longitudinal fold, from three panels 4, 5 and 6 below the longitudinal fold. A left and a right lateral folds are shown also in FIG. 1B, and these extend fully across cover 10 at right angles to the longitudinal fold. As shown in FIG. 7, a second web 20 joins panels 4 and 5 and is flush with a bottom surface (surface that contacts windshield 40) of these panels. Also, as shown in FIG. 7, panels 1 and 2 are joined by web 30 along the left lateral fold. In FIG. 8 we see that panels 2 and 3 are joined by a third web 20 that is flush with the bottom surface of panels 2 and 3. A second web 30 joins panels 5 and 6 and is flush with the top surface of cover 10.

Each of the panels 1-6 of cover 10 are preferably of equal thickness and are preferably between about one and one and a half inches in thickness, so as to provide a significant barrier to objects that may strike windshield 40. As shown in FIG. 5 panels 1-6 are folded into a stack where the panels are aligned one above the next with panel 1 on top and panel 6 on the bottom of the stack. Webs 30 are wider than webs 20 as can be seen in the figures because webs 30 extend across the thickness of two panels. In contrast, it can be seen that webs 20 need not extend at all but merely fold over into a U-shape as shown in FIG. 5. One of the web 30 extends from the top of panel 2, across the sides of panels 5 and 4 to panel 1. The other of the web 30 extends from the panel 5, across the sides of panels 2 and 3, to panel 6. To accomplish extending over these distances, webs 30 are preferably made of a stretch fabric such as Lycra® or Spandex®. This elastic webbing; keeps the panels in close proximity, when placed on the windshield stretching as needed when the panels are folded.

A pair of handles 50, as shown in FIGS. 1A and 1B, may be used and preferably are located at the top, center of panel 1 and the bottom, center of panel 6 as illustrated. This positioning enables the handles 50 to be adjacent when the cover 10 is folded as shown in FIG. 5 and therefore allows conveniently carrying the cover 10. The handles 50 are preferably made of a durable nylon mesh material.

The cover 10 is secured to the vehicle by straps 60 extending from both sides of the cover 10, the straps 60 preferably being clamped between the vehicle's windows or doors to hold the cover 10 securely in place thereby protecting the cover 10 from theft. The straps 60 are preferably made from a durable nylon mesh material similar to that of handles 50.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An impact resistant cover for protecting a vehicle windshield comprising:
    a plurality of spaced apart rectangular panels, the panels having a flexible, puncture resistant, covering, the covering enclosing a resilient material having a thickness of between 0.5 and 1.5 inches; and
    flexible webs permanently interconnecting the panels, the webs of such flexibility and extent as to enable the panels to lie in a common plane in a first selective positioning of the panels, and alternately to lie one panel atop the next panel in a vertically aligned stack of all of the panels, in a second selective positioning of the panels.

2. The impact resistant cover of claim 1 having a size, when lying in the first selective positioning of the panels, capable of covering an automotive windshield.

3. The impact resistant cover of claim 2 having length of about 60" and a width of about 40".

4. The impact resistant cover of claim 2 wherein the panels are six in number and referred to as panels (1, 2, 3, 4, 5, and 6).

5. The impact resistant cover of claim 4 further comprising a longitudinal fold flush with a top surface of the cover, and extensive across the length of the cover separating panels, (1, 2, and 3) to one side of said longitudinal fold from panels (4, 5 and 6) to the opposing side of the longitudinal fold.

6. The impact resistant cover of claim 5 further comprising a left and a right lateral folds at right angles to the longitudinal fold.

7. The impact resistant cover of claim 6 further comprising a second web joining panels (4 and 5) and positioned flush with a bottom surface of these panels.

8. The impact resistant cover of claim 7 wherein panels (1 and 2) are joined by the left lateral fold and panels (2 and 3) are joined by a web that is flush with the bottom surface of panels (2 and 3), and panels (5 and 6) are joined by a further web flush with the top surface of the cover.

9. The impact resistant cover of claim 1 wherein each of the panels are of equal thickness and between about 1 and 1.5 inches in thickness.

10. The impact resistant cover of claim 1 wherein at least one of the webs is made of a stretch fabric.

11. The impact resistant cover of claim 1 further comprising a pair of handles, one of said handles located at the top, center of panel (1) and the another of said handles located at the bottom, center of panel (6), the handles thereby in adjacent positions when the panels are in the second selective positioning of the panels.

12. The impact resistant cover of claim 1 further comprising plural straps extending from both sides of the cover, the straps having a length enabling clamping a portion of the straps in a vehicle's windows or doors when the cover is on a windshield of the vehicle.

\* \* \* \* \*